United States Patent

[11] 3,561,626

| [72] | Inventor | Carlton S. Sprague |
| | | Huntington, Ind. |
| [21] | Appl. No. | 829,026 |
| [22] | Filed | May 29, 1969 |
| [45] | Patented | Feb. 9, 1971 |
| [73] | Assignee | Shuttlework Machinery Corporation, |
| | | Huntington, Ind. |
| | | a corporation of Indiana |

[54] SINGLE ROWER FOR CASE UNPACKING APPARATUS
8 Claims, 3 Drawing Figs.

| [52] | U.S. Cl. | 214/309, 198/32 |
| [51] | Int. Cl. | B65b 21/04 |
| [50] | Field of Search | 214/309; 198/32 |

[56] References Cited
UNITED STATES PATENTS

| 1,898,393 | 2/1933 | Rickers | 214/309UX |
| 2,442,827 | 6/1948 | Schmidt | 214/309 |

*Primary Examiner*—Gerald M. Forlenza
*Assistant Examiner*—George F. Abraham
*Attorney*—Woodard, Weikart, Emhardt and Naughton

ABSTRACT: A case unpacker for removing cans from a box and placing them on a conveyor in single file. A vacuum lifting head is movable vertically to engage the cans and deposit them on a platform in a pattern of parallel rows. A pusher bar operates to push the cans off the platform and onto a can conveyor. A blocking bar extends across the can conveyor and is retractable at a given speed to permit the rows of cans to move in order on said can conveyor. The cans are guided into single file by a guide bar extending at an angle across the can conveyor.

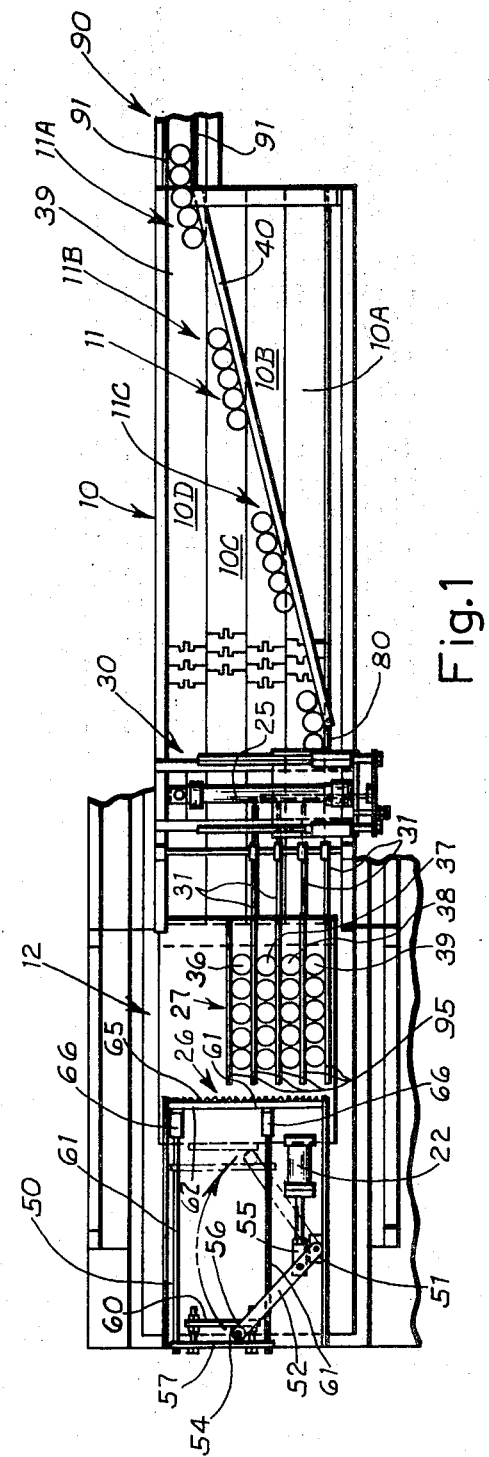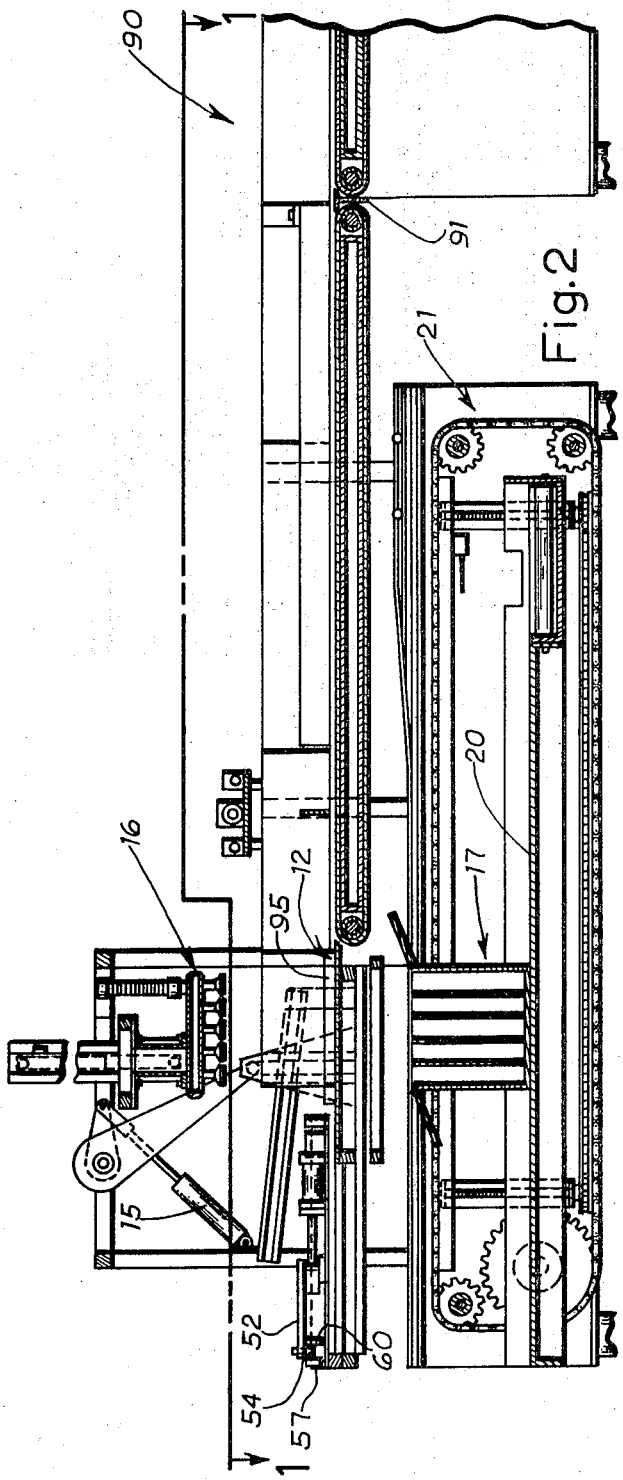

SINGLE ROWER FOR CASE UNPACKING APPARATUS

BACKGROUND OF THE INVENTION

1. Field of the Invention

This invention relates to apparatus for placing object in a single row and to case unpacking apparatus.

2. Description of the Prior Art

While at one time the canning, bottling and packing industries were only or primarily interested in automatic case packers, there is now substantial interest and market for automatic case unpacking apparatus. Thus, a bottling plant, for example, might have empty bottles delivered to in cases. The bottling plant would then preferably use automatic apparatus for unpacking the bottles from the cases and arranging them in a single row on a conveyor whereupon they would be automatically filled with the substance being bottled. The bottles would then be repacked in cases by an automatic case packer such as the one disclosed in a my U.S. Pat. No. 3,386,224 issued June 4, 1968. By certain modifications, the case packer of my patent can operate as a case unpacker. It is desirable, however, to provide means for causing the case unpacker output to be arranged quickly and efficiently in single file. One example of the prior art in this area is the U.S. Pat. to Smith No. 2,744,641.

SUMMARY OF THE INVENTION

One embodiment of this invention might include, in object handling apparatus including an object for conveying rows of objects extending in the direction of movement of said conveyor, said object conveyor having an input end and an output end, the improvement which comprises a blocking bar extending across said object conveyor, means for moving said blocking bar transversely of said object conveyor at a given rate such as to unblock in order the rows of objects on said object conveyor, and guide means positioned at an angle across said object conveyor for guiding said objects into single file relation on said object conveyor.

One object of this object invention is to provided an object handling apparatus capable of arranging objects in a single row on a conveyor.

Still another object is to provide improve case unpacking apparatus.

BRIEF DESCRIPTION OF THE DRAWINGS

The full nature of the invention will be understood from the accompanying drawings and the following description and claims.

FIG. 1 is a top plan view of case unpacking apparatus embodying the present invention.

FIG. 2 is a side elevation of the structure illustrated in FIG. 1.

DESCRIPTION OF THE PREFERRED EMBODIMENT

Figure 3:
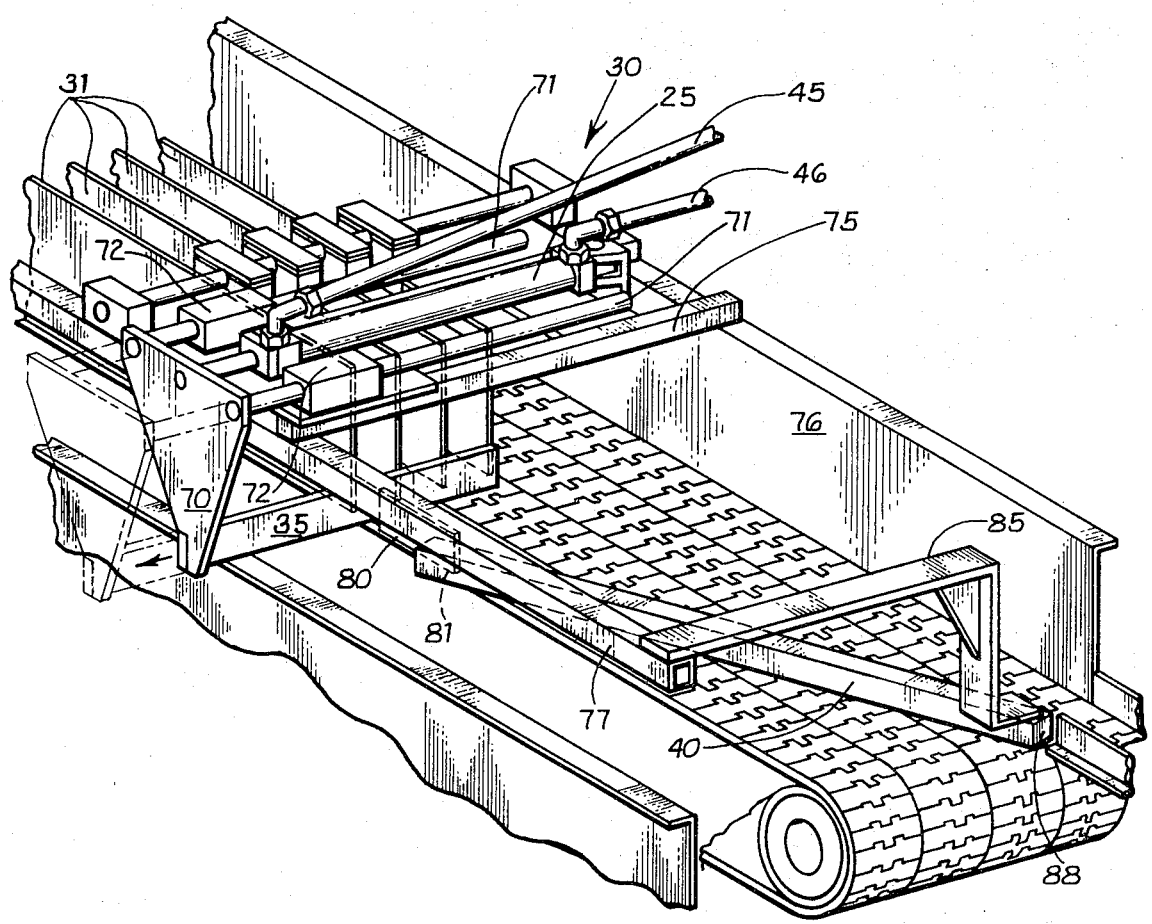
FIG. 3 is a perspective view of certain portion of the structure illustrated in FIGS. 1 and 2.

Referring now more particularly to the drawings, it should be understood that the case packer disclosed in my U.S. Pat. No. 3,386,224 is basically the same structure used in the present invention. In other words, a few parts are subtracted or taken away from the case packer of my patent and a few parts are added in order to reverse the operation from one of packing to unpacking but, in most respects, the structure illustrated in my patent is also used in the present invention. Consequently, reference is made to my patent for details of the basic structure disclosed in this application.

Referring to FIG. 1, there is disclosed a conveyor for cans, objects or bottles. As illustrated, the can conveyor includes four separate conveyors 10A, 10B, 10C and 10D. It should be understood, however, that the invention operates just as well with a single conveyor 10 as disclosed in my patent. Contrary to my patent, however, the conveyor 10 is operated to move the objects or cans 11 rightwardly as viewed in FIG. 1 instead of leftwardly as in FIG. 1 of my patent.

A pan or platform 12 is aligned with and adjacent to the can conveyor 10 when the platform is in the position of FIGS. 1 and 2. The platform 12 is movable leftwardly from the positions of FIGS. 1 and 2 by means of the hydraulic cylinder 15 to a position where it is out of the path of the lifting head or vacuum head 16. The manner of mounting of the platform as well as the structure for moving the platform by the cylinder 15 is disclosed in my patent. In the present apparatus, the function of the lifting head 16 is to move down into the box 17, engage and grasp the bottles or cans in the box 17 and lift them upwardly to a position above the illustrated position (FIGS. 1 and 2) of the platform 12 for subsequent depositing of the bottles or cans on the platform.

The structure for accomplishing these operations is disclosed in my patent. However, the operation is reversed. This reversal of operation is easily accomplished by adjustment of the various cams disclosed in FIG. 15 of my patent and by suitable adjustment of the timing of delivery of the vacuum to the vacuum head 16. It will also be noted that the funnel of my patent has been removed since it has no function in the present structure. The box 17 rests upon a supporting surface 20 and is moved by a box conveyor 21 only partially disclosed in FIG. 2. The various details of the box conveyor are more completely disclosed in my patent.

In my patent, there is disclosed a hold back mechanism 210 which is operated by a hydraulic cylinder 212 to control the movement of the cans onto the platform. In the present apparatus, no hold back means is needed or provided and the hydraulic cylinder control normally used for operating the hold back means is instead used to operate a hydraulic cylinder 22 and a hydraulic cylinder 25. The hydraulic cylinder 22 forms a part of a pusher bar mechanism 26 which functions to push the pattern 27 of cans off of the platform 12 and onto the object conveyor 10. The hydraulic cylinder 25 forms a part of a blocker bar assembly 30 the function of which is to unblock, in order, the rows of cans 11 as they move on the can conveyor 10.

Fixed in a parallel relationship an positioned above the upper surface of the can conveyor 10 are a plurality of guide members 31. When the pattern of cans 27 is pushed off of the platform 12 by the pusher bar mechanism 26, the cans move onto the object conveyor 10 and are moved rightwardly as viewed in FIGS. 1 and 2 by the object conveyor. The guide members 31 keep the cans 11 in the same pattern as illustrated in FIG. 1, that is, in four rows of five cans with the four rows extending in the direction of movement of the can conveyor 10.

Initially, the blocker bar 35 of the blocker bar assembly 30 is positioned so as to block movement of all of the cans of the pattern 27 except for the first row 36. Thus, this first row 36 moves rightwardly past the blocker bar 35 even though the other three rows 37, 38 and 39 are blocked and maintained stationary on the object conveyor 10. The function of the guide members 31 is to keep the rows 36, 37, 38 and 39 aligned or extending in the same direction as the movement of the can conveyor 10.

Hydraulic fluid is provided to the hydraulic cylinder 25 at such a rate through the conduits 45 and 46 that the blocker bar 35 does not move out of the path of the row 37 of cans until such time as the row 36 of cans has moved a sufficient distance along the object conveyor 10 that the last can in the row is ahead of the first can in the next row. The blocker bar 35 continues to retract at the same rate of speed, thus, also spacing all of the cans of the row 38 behind all of the cans of the row 37 and all of the cans of the row 39 behind all of the cans of the row 38.

Fixed at an angle and extending across the surface of the can conveyor 10 is a guide member 40. As the cans 11 move on the conveyor 10 in a rightward direction, they eventually come into contact with the guide member 40 and are caused to move over to the one side 39 of the object conveyor 10.

Because of the fact that the blocker bar 35 has prevented the rows from being laterally located and has instead located them so that they are one behind the other, the guide bar 40 does not cause the cans to run into one another but instead aligns them with the rows behind one another as suggested for the three rows 11A, 11B and 11C at the rightward portion of FIG. 1.

Referring now more particularly to the pusher bar assembly 26, a tray 50 is fixed to the frame of the case unpacker and has fixedly mounted thereon a block 51 to which is pivoted an arm 52. The arm acts as a lever and has the piston rod 55 of the hydraulic cylinder 22 pivoted to it. The distal end of the arm 52 has a block 54 pivoted to it by a pin 56. The block rides between a pair of parallel members 57 and 60. The member 60 is fixed to the member 57 in spaced parallel relation to provide a pair of surfaces against which the block 54 acts. Thus, when the piston rod 55 is retracted, the block forces against the member 60 moving the member 57 rightwardly. When the piston rod 55 is projected, the block acts against the member 57 and moves it leftwardly.

Fixed to the member 57 is a pair of rods 61 to the ends of which is fixed a pusher bar 62 having a rubber or soft surface 65. The rods 61 are slidably received within bearing blocks 66 which are fixed to the tray 50. The bearing blocks act as guide means maintaining the travel of the pusher bar 62 and the other parts fixed thereto straight and true between the solid line and dotted line positions of FIG. 1.

The blocker bar assembly 30 is shown in greatest detail in FIG. 3 and includes the blocker bar 35 which is fixed to a connecting member 70. The connecting member 70 is in turn fixed to a pair of guide rods 71 which are slidably received in bearing blocks 72. The bearing blocks 72 are mounted on cross members 75 which are fixed at their opposite ends to a vertical side guide element 76 and to frame member 77. The bearing blocks 72 and the guide members 71 function to keep the travel of the blocker bar straight and true in the direction of its length and perpendicular to the direction of movement of the object conveyor.

As mentioned, there is provided guide members 31 to keep the rows in alignment as they move off of the platform 12. A further guide member 80 is fixed to the frame in alignment with the outside guide member 31. The blocker bar 35 moves between the guide member 80 and the outside guide member 31. The guide member 80 functions to keep the cans on the conveyor 10 until the cans move against the guide member 40 into which the guide member 80 leads. The guide member 40 is fixed to the frame at one end 81 and at its other end 82 is fixed to mounting structure 85 which is in turn connected to frame structure 77. Adjacent to the conveyor 10 there may be located an additional conveyor 90 which has side guides 91 for the cans along in single file for filling or the like. Between the conveyor 10 and the conveyor 90 a guide member 91 is positioned for guiding the cans over to the further conveyor 90.

The platform 12 differs from the platform of my patent in that there are guide members 95 fixed to the platform. These guide members are sufficiently short to allow the pusher bar 62 to pass over the top of the guide members. The function of the guide members 95 is to guide the cans in single file as they are pushed by the pusher bar. Alternatively the guide members can be taller if the pusher bar has a comblike configuration to fit down between the guide members to push the cans.

It will be evident from the above description that the present invention provides an improved case unpacking apparatus. It will also be evident that the present invention provides an object handling apparatus capable of arranging objects in a single row on a conveyor.

I claim:

1. Case unpacking apparatus comprising an object conveyor having an input end and an output end, means for moving a box with rows of objects therein to a position spaced horizontally of said input end but below said object conveyor, a lifting head positioned over said position and adapted to engage a layer of objects for lifting and upward movement thereof out of said box, a platform, means for moving said platform to a position adjacent the input end of said conveyor and below said lifting head for receiving objects from said lifting head, means for pushing said objects off of said platform onto said object conveyor, blocking means for preventing movement of said objects on said conveyor past a certain point, means for moving said blocking means across said object conveyor at a predetermined rate so as to unblock in order the rows of objects on said object conveyor, and guide means post positioned at an angle across said object conveyor for guiding said objects into single file relation on said object conveyor.

2. The apparatus of claim 1 additionally comprising a plurality of parallel object guide members positioned above said object conveyor and extending in the direction of movement of said conveyor, said object guide members being positioned between said input end and said blocking means.

3. The apparatus of claim 2 wherein said guide members each have one end positioned closer to the output end of said conveyor than the remaining portion of the respective guide member, said one ends being aligned in a direction perpendicular to the direction of movement of said conveyor, said blocking means including a straight bar the length of which extends perpendicularly to the direction of movement of said conveyor and is positioned adjacent said one ends, said means for moving said blocking means including a hydraulic cylinder coupled to said straight bar and adapted to move said bar longitudinally thereof.

4. The apparatus of claim 3 wherein said means for pushing said objects off of said platform comprises a straight pusher bar which extends perpendicularly of the direction of movement of said object conveyor, a pair of guide rods fixed at one end to said pusher bar and extending in the direction of movement of said object conveyor, a frame, a pair of bearing blocks fixed to said frame, said guide rods extending through said said bearing blocks, a first cross member fixed to the other ends of said guide rods, a further cross member fixed in parallel spaced relation to said first cross member and defining a slot between said cross members, a hydraulic cylinder fixed to said frame and having a piston rod, a lever pivoted to said frame, a block pivotally secured to said lever and received in said slot, said piston rod being pivotally secured to said lever for moving sad said lever and causing said block to act in said slot against said cross members to move said pusher bar across said platform, said bearing blocks acting as guide means for guiding the movement of said guide rods and pusher bar toward and away from the direction of movement of said object conveyor.

5. In object handling apparatus including an object conveyor for conveying rows of objects extending in the direction of movement of said conveyor, said object conveyor having an input end and an output end, the improvement which comprises a blocking bar extending across said object conveyor, means for moving said blocking bar transversely of said object on conveyor at a given rate such as to unblock in order the rows of objects on said object conveyor, and guide means positioned at an angle across said object conveyor for guiding said objects into single file relation on said object conveyor.

6. The apparatus of claim 5 additionally comprising a plurality of parallel object guide members positioned above said object conveyor and extending in the direction of movement of said conveyor, said object guide members being positioned between said input end and said blocking means.

7. The apparatus of claim 6 wherein said guide members each have one end positioned closer to the output end of said conveyor than the remaining portion of the respective guide member, said one ends being aligned in a direction perpendicular to the direction of movement of said conveyor, said blocking means including a straight bar the length of which extends perpendicularly to the direction of movement of said conveyor and is positioned adjacent said one ends, said means for moving said blocking means including a hydraulic cylinder coupled to said straight bar and adapted to move said bar longitudinally thereof.

8. The apparatus of claim 1 additionally comprising guide means mounted on said platform for maintaining said objects in column as they are moved on said platform and onto said object conveyor by said means for pushing.